US012808524B2

(12) United States Patent
Bültmann et al.

(10) Patent No.: US 12,808,524 B2
(45) Date of Patent: Nov. 24, 2026

(54) RING LAMP WITH ANNULAR HOUSING AND LED ILLUMINATING MEANS ACCOMMODATED THEREIN

(71) Applicant: ELEKTRA GESELLSCHAFT FÜR ELEKTROTECHNISCHE GERÄTE MBH, Enger (DE)

(72) Inventors: Henrik Bültmann, Halle (DE); Dirk Jürgens, Preussisch (DE); Andreas Schwarz, Bünde (DE)

(73) Assignee: Elektra Gesellschaft Für Elektrotechnische Gerate MBH, Enger (DE)

( * ) Notice: Subject to any disclaimer, the term of this patent is extended or adjusted under 35 U.S.C. 154(b) by 0 days.

(21) Appl. No.: 19/147,298

(22) PCT Filed: Feb. 16, 2024

(86) PCT No.: PCT/EP2024/054041
§ 371 (c)(1),
(2) Date: Jul. 10, 2025

(87) PCT Pub. No.: WO2024/175507
PCT Pub. Date: Aug. 29, 2024

(65) Prior Publication Data

US 2026/0227057 A1 Aug. 6, 2026

(30) Foreign Application Priority Data

Feb. 22, 2023 (DE) ......................... 202023100820.8

(51) Int. Cl.
*F21V 23/00* (2015.01)
*F21V 33/00* (2006.01)
(Continued)

(52) U.S. Cl.
CPC ........ *F21V 23/001* (2013.01); *F21V 33/0012* (2013.01); *F21Y 2105/16* (2016.08); *F21Y 2105/18* (2016.08); *F21Y 2115/10* (2016.08)

(58) Field of Classification Search
CPC . F21Y 2115/10; F21S 4/20; F21S 4/22; F21S 4/24; F21S 4/26; F21S 4/28; F21V 33/0012; F21V 33/0016
See application file for complete search history.

(56) References Cited

U.S. PATENT DOCUMENTS 10,322,667 B2 * 6/2019 Bennett ................ B60Q 1/0035
11,143,366 B1 * 10/2021 Lin ........................... F21S 4/24
(Continued)

FOREIGN PATENT DOCUMENTS

CN 216521064 U 5/2022
DE 29911536 U1 11/1999
(Continued)

OTHER PUBLICATIONS

WIPO, Internatioal Search Report (in a corresponding application), May 24, 2024.

*Primary Examiner* — Robert J May
(74) *Attorney, Agent, or Firm* — Laurence P. Colton; Smith Tempel Blaha LLC

(57) ABSTRACT

A ring lamp having a ring-shaped, in particular circular, oval, rectangular or square receiving housing surrounding an intermediate space (Z). An illuminating means, preferably an LED illuminating means, is received in the receiving housing, said illuminating means extending correspondingly in an annular, in particular, circular, oval, rectangular or square manner. An annular, in particular circular, oval, rectangular, or square cover element closes the receiving housing. The illuminating means is electrically connected, directly or indirectly via a plug, to a line via contacts, preferably contact surfaces. The line is guided as a flat line
(Continued)

out of the receiving housing or, on the side of the receiving housing facing away from the illuminating means, a protruding feedthrough is arranged, through which the line is guided, in particular as a flat line.

18 Claims, 5 Drawing Sheets

(51) Int. Cl.

| | |
|---|---|
| *F21Y 105/16* | (2016.01) |
| *F21Y 105/18* | (2016.01) |
| *F21Y 115/10* | (2016.01) |

(56) References Cited

U.S. PATENT DOCUMENTS

| | | | | |
|---|---|---|---|---|
| 12,638,146 | B1 * | 5/2026 | Zheng | F21S 8/026 |
| 2006/0087844 | A1 * | 4/2006 | Swaris | F21S 4/20<br>362/812 |
| 2007/0177381 | A1 * | 8/2007 | Kwiatt, III | A47B 97/00<br>362/249.16 |
| 2021/0068541 | A1 | 3/2021 | Zhou | |

FOREIGN PATENT DOCUMENTS

| | | | |
|---|---|---|---|
| DE | 69836978 | T2 | 10/2007 |
| DE | 202007012249 | U1 | 10/2007 |
| DE | 202010001923 | U1 | 5/2010 |
| DE | 202013102479 | U1 | 9/2014 |
| DE | 202021100865 | U1 | 3/2021 |
| EP | 3412965 | A1 | 12/2018 |

* cited by examiner

RING LAMP WITH ANNULAR HOUSING AND LED ILLUMINATING MEANS ACCOMMODATED THEREIN

CROSS REFERENCE TO RELATED APPLICATIONS

This application is the US National Phase of and claims the benefit of and priority on International Application No. PCT/EP2024/054041 having an international filing date of 16 Feb. 2024, which claims priority on and the benefit of German Patent Application No. 20 2023 100 820.8 having a filing date of 22 Feb. 2023.

BACKGROUND OF THE INVENTION

Technical Field

The invention relates to a ring lamp.

Prior Art

Ring lamps are luminaires that are used, for example, in furniture construction and comprise an annular luminous surface that usually surrounds an intermediate space. Ring lamps within the meaning of this invention may be circular, oval, rectangular, square or otherwise shaped, as long as there is a luminous section that completely or at least partially surrounds an intermediate space. A ring shape therefore does not necessarily have to be a circular ring shape.

The installation of such luminaires in furniture construction basically has two variants: built-in luminaires, in which supply lines are routed through a furniture component, and retrofit variants, in which no feedthroughs are typically present. Sometimes the lines have to be routed in such cases along the surface of the furniture component.

BRIEF SUMMARY OF THE INVENTION

The problem addressed by the present invention is that of creating a ring lamp which is suitable for both installation variants and offers optical advantages, particularly in the retrofit variant.

This problem is solved by a ring lamp comprising a receiving housing which is annular, in particular circular, oval, rectangular, or square, and which surrounds an intermediate space, and in which an illuminating means, preferably an LED illuminating means, is accommodated, said illuminating means extending correspondingly in an annular, in particular circular, oval, rectangular, or square manner, and a cover element which is annular, in particular circular, oval, rectangular, or square, and which closes the receiving housing, wherein the illuminating means is electrically connected to a line via contacts, preferably contact surfaces, directly or indirectly via a plug, wherein the line is guided as a flat line out of the receiving housing, or on the side of the receiving housing facing away from the illuminating means, a protruding feedthrough is arranged, through which the line is guided, in particular as a flat line as well as a furniture component to which at least one ring lamp as taught herein is attached, wherein the line is guided through a recess in the furniture component or is glued as a flat line to a surface of the furniture component. Advantageous embodiments can be found in the dependent claims.

The ring lamp according to the invention comprises an annular, in particular circular, oval, rectangular or square receiving housing which surrounds an intermediate space and in which an illuminating means, preferably an LED illuminating means, is accommodated, said illuminating means extending correspondingly in an annular, in particular circular, oval, rectangular or square manner, as well as an annular, in particular circular, oval, rectangular or square cover element which closes the receiving housing. The housing and the cover element enclose the annular, in particular circular, oval, rectangular or square-shaped illuminating means and thus protect it from environmental or ambient influences. The cover element is at least partially transparent, opaque or at least translucent in order to allow the light emitted by the illuminating means to pass through at least partially. CSP LEDs are preferred as the LED illuminating means. Due to the compact installation space achieved with this technology, these allow a reduction in the overall height of the ring lamp according to the invention and make possible a glare-free implementation. A luminaire with a comparatively low overall height can thus be implemented.

In principle, the LED illuminating means used may be complete closed rings, but it is preferred that the illuminating means according to the invention is composed of LED segments. In this way, improved sustainability can be achieved in the manufacture of the illuminating means according to the invention, since less waste per unit area is generated, since the corresponding LED segments can be arranged on a material blank in a significantly more space-saving manner than complete rings.

In the ring lamp according to the invention, the illuminating means is electrically connected directly or indirectly via a plug to a line via contacts, preferably contact surfaces. According to an embodiment of the invention, the line is guided as a flat line out of the receiving housing or, on the side of the receiving housing facing away from the illuminating means, a protruding feedthrough is arranged through which the line is guided, in particular as a flat line. In the first variant, involving the use of a flat line, it is possible to retrofit the ring lamp onto a furniture component or a wall or ceiling. The electrical connection from the power source to the illuminating means is provided via the flat line, which can be arranged on a surface and therefore hardly takes up any space. If the carrier material of the flat line is colored to match the color of the surface to which it is applied, the routing of the line will hardly be noticeable. If, on the side of the receiving housing facing away from the illuminating means, a protruding feedthrough is arranged through which the line is guided, the ring lamp will be suitable for installation in a furniture component or other object. The line is then routed into the carrier and can be routed either beneath the surface or through the interior. In this case as well, flat lines are particularly suitable because they can be easily routed in shallow grooves or through cross-holes, whereby shallow grooves or cross-holes generally do not affect the stability of the carrier, preferably of a furniture component.

In a preferred embodiment, when a flat line is used, it is formed from a strip of a flexible insulating material, in particular a plastics material, with conductor tracks and contacts or contact surfaces applied thereto. The use of a flexible insulating material allows the flat line to be easily adapted to the topography of the surface, thus facilitating the installation of a ring lamp. Preferably, the applied conductor tracks and the contacts or contact surfaces are arranged on the side of the flat line that faces the surface on which the flat line is or is to be arranged.

Preferably, the line is soldered to a contact or contact surface of the illuminating means. Soldering the contacts provides a firm and therefore quite stable connection, which increases the service life of the connection, particularly with larger current flows. Other connection options are of course also conceivable, such as plug contacts. The same applies to the LED segments mentioned above, if used.

In an embodiment of the ring lamp according to the invention, it is particularly preferred for the receiving housing and/or the line to comprise a self-adhesive layer. A self-adhesive layer allows a quick installation without the need for additional retaining elements. This means that the ring lamp can be installed in a pre-assembled state, and eliminates the need to conceal other holding elements such as screws after installation. According to a further embodiment, the self-adhesive layer mentioned can be designed in such a way that the luminaire can be detached from a furniture component when it is disposed of or replaced. Accordingly, the adhesive layer can be detached, for example by being stretched and thereby losing its adhesive strength. This also allows a more resource-efficient disposal, since now only the luminaire would have to be disposed of as electronic waste rather than the entire furniture component. It can also be provided that the components of the ring lamp according to the invention are connected to one another by plugging or clipping them together, preferably without using tools. In this way, the disassembly of a defective luminaire into its components is further facilitated and the volume of electrical waste is significantly reduced, since only the lines or the illuminating means or LED components need to be disposed of as such.

In a further preferred embodiment, an opening is provided in the receiving housing at which the feedthrough is arranged. The feedthrough is preferably intended for the case in which the ring lamp is used as a built-in variant. In the furniture component, wherein the term furniture component is used in this case as a synonym for support objects in general, a corresponding recess is then introduced which accommodates the feedthrough and/or, at least partially, the receiving housing. It is particularly preferred for the line to be in contact with the illuminating means through the opening. For this purpose, a line duct is preferably routed through the relevant furniture component up to the recess for the feedthrough.

In a particularly preferred embodiment, the line is at least a 2-wire, preferably 3-wire, line. The aim is to minimize the number of wires in the line. A 2-wire line may be used if the ring lamp does not require grounding. If the ring lamp requires grounding, a 3-wire line is recommended to avoid having to lay a separate grounding line.

It is particularly preferred in the ring lamp according to the invention for the flat line to have at least one of the following properties:

a) a current-carrying capacity of 4-8 A, preferably at least 6 A;
b) a dielectric strength of 200-800 V, preferably at least 500 V;
c) a width of 5-10 mm, preferably 6.5 mm;
d) a strain relief at at least one or both ends;
e) a length of 200 mm-400 mm, preferably 300 mm;
f) a thickness of 0.1-0.5 mm, preferably 0.3 mm;
g) a self-adhesive layer.

Depending on the field of application and the type of illuminating means used, the requirements for the lines vary. If a low-voltage luminaire is used, the current-carrying capacity is of particular importance (without neglecting the other criteria). In the case of a household power supply or even a high-voltage power supply, dielectric strength is particularly important. The width of the line is very significant when laying the lines, especially in the case of concealed lines, since the lines may need to be laid in prefabricated ducts, for example. Strain relief is particularly advantageous where the lines are subjected to tension when being laid or when the ring lamp is being mounted. If at all possible this tension should strain the contacts. The length of the lines should be such that the free end of the line reaches the contact point of the power supply coming from the voltage source. In furniture construction in particular it has been found that a line length between 200 and 400 mm is sufficient, with a length of 300 mm being preferred. Regarding the thickness of the flat line, a high degree of flexibility is desirable, but this must be combined with a conductivity that meets the requirements. A self-adhesive layer is particularly preferred if the luminaire is to be retrofitted. A self-adhesive layer facilitates installation and eliminates the need for additional means of holding the line, allowing it to be mounted easily and almost invisibly.

The problem addressed by the invention is also achieved by a furniture component to which at least one ring lamp according to one of the embodiments described above is attached, wherein the line is guided through a recess in the furniture component or is glued as a flat line to a surface of the furniture component.

BRIEF DESCRIPTION OF THE DRAWINGS

The invention will be explained in more detail in the following with reference to FIGS. 1 to 11.

DETAILED DESCRIPTION OF PREFERRED EMBODIMENTS

Figure 1:
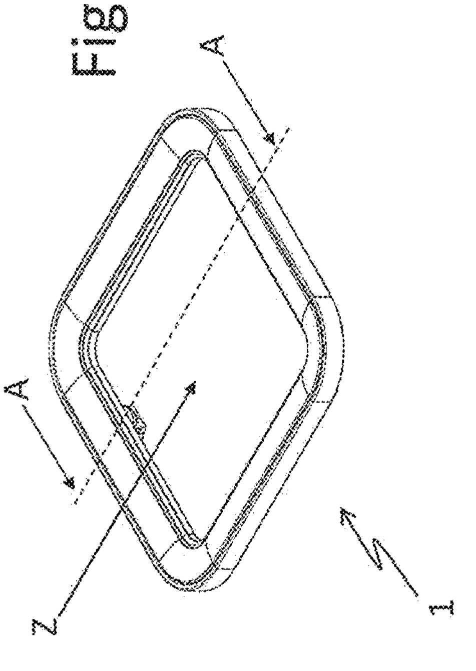
FIG. 1 shows a ring lamp in a square embodiment in a perspective view.

FIG. 1 shows, in a perspective view, a ring lamp 1 in which the luminous surfaces are arranged around an intermediate space Z. In this embodiment, the luminous surface is arranged approximately in a square shape around the intermediate space Z. It is referred to as "approximately" square because the corners of the square are rounded.

Figure 2:
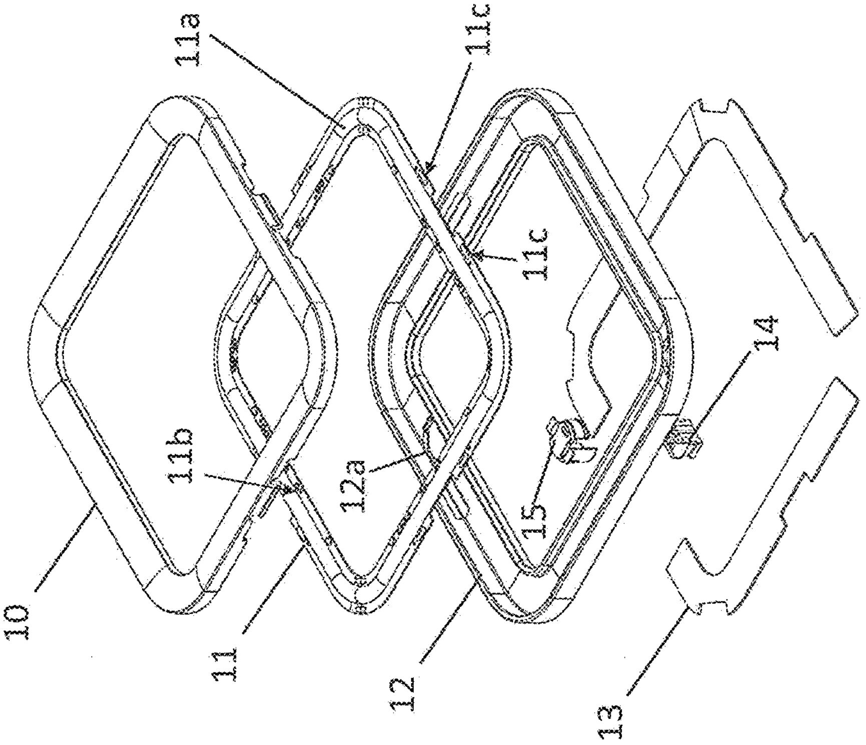
FIG. 2 shows the ring lamp in an exploded view.

The structure is shown in an exploded view of the ring lamp 1 in FIG. 2. The illuminated means carrier 11, which contains the illuminating means 11*a* and contacts or contact surfaces 11*b*, is inserted into a receiving housing 12, which is designed as a circumferential groove. The groove of the receiving housing 12 is covered by a cover element 10, which shields the illuminated means carrier 11 from the outside. The cover element 10 is generally at least partially transparent to light, and is preferably transparent, translucent or semi-transparent. An opening 12*a* is provided in the base of the housing 12 through which the illuminated means carrier 11 can be contacted. In the embodiment shown, a plug 15 is arranged in a feedthrough 14 for this purpose. This allows, especially in the case of a built-in version of the ring lamp 1, concealed wiring that is not visible from the outside to be pre-installed, to which the ring lamp is connected by means of a plug connection. If the ring lamp needs to be replaced, the plug connection can be removed and the replacement can be carried out without replacing the wiring. A self-adhesive layer is arranged beneath the receiving housing 12. This means that the ring lamp can be easily and safely arranged in or on the furniture component 2 without requiring additional fastening such as a screw connection.

Figure 3:
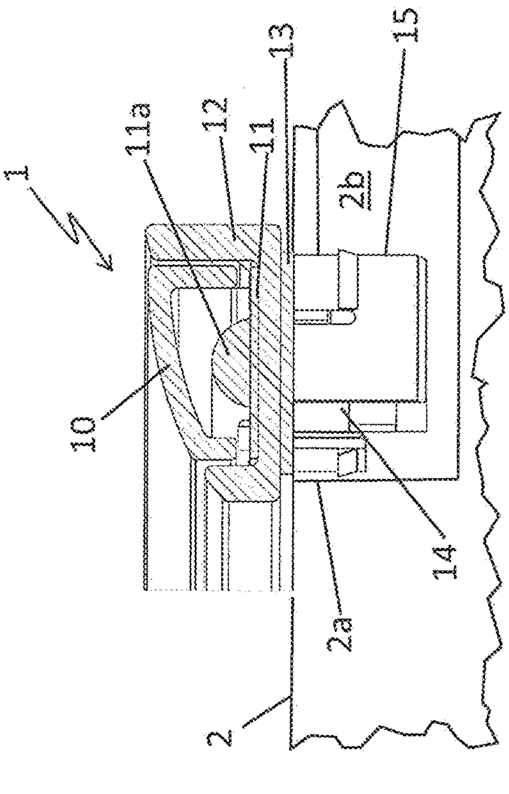
FIG. 3 shows the partial section through a ring lamp with a feedthrough in the installed state.

FIG. 3 shows a section A-A (FIG. 1) through the ring lamp 1. The section shows the area where the feedthrough 15 is located. The ring lamp 1 itself, specifically the housing 12 with the illuminated means carrier 11 and the cover element 10, is arranged on a furniture component 2 by means of a self-adhesive layer 13 in such a way that the feedthrough 15 dips into a recess 2*a* in the surface of the furniture component 2. In this arrangement, a plug 14, which is correspondingly connected to the contacts or contact surfaces 11*b* of the illuminated means carrier 11, has the contact region in a second recess 2*b* below the surface so that a line 16 (not shown here), which is guided through this recess 2*b*, can be connected to the plug 14. In this built-in version, the line routing is not visible to an outside observer. Another function of the feedthrough 15 is to also serve as a centering pin for the arrangement of the ring lamp 1. When inserted into the recess 2*a*, the feedthrough 15 determines the position of the ring lamp 1, and if the recess 2*a* is sufficiently narrow, the orientation of the ring lamp 1 will be determined by the self-adhesive layer 13.

Figure 4:
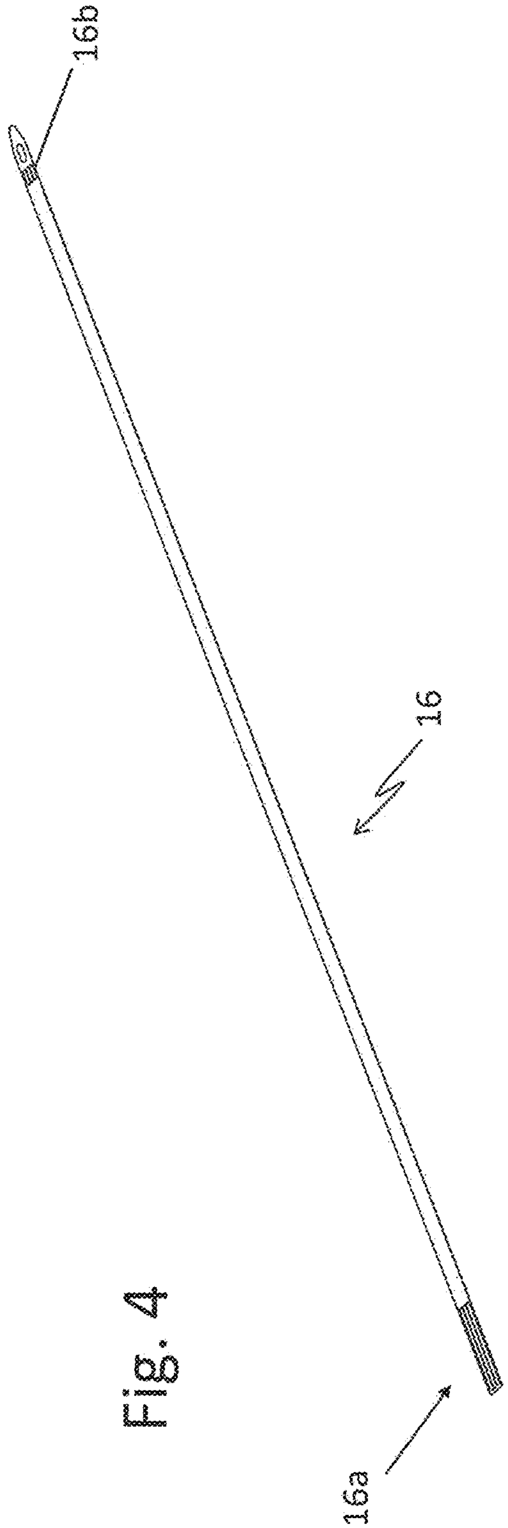
FIG. 4 shows a flat line.

FIG. 4 shows an embodiment of the line 16. FIG. 4 shows a 3-wire line 16 with a contact surface 16*a* facing the illuminating means and, at the other end of the line 16, a contact surface 16*b* facing the power supply. The contact surface 16*a* facing the illuminating means can be a plug connection which can be inserted into a plug 15 as shown in FIG. 3. However, this contact surface 16*a* may alternatively be a solderable contact surface 16*a* or a clampable contact surface 16*a*. At the other end of the line 16, the contact surface 16*b* is arranged facing the power supply. A plug, clamp and/or solder connection is also possible at this end. In the embodiment shown, the end with the contact surface 16*b* for power supply is provided with a strain relief. If the ring lamp 1 is removed from its seat, it will certainly be possible to pull on the line 16. To prevent the contact surface 16*b* from being subjected to tensile stress and thus damaged, the end may be held by a strain relief. The length of the line is arbitrary, but should be sufficient to connect the power supply to ring lamp 1. It has been shown that a length between 200 and 400 mm is sufficient for most applications; a length of 300 mm is preferred for most applications. To ensure that the line 16, which is preferably designed as a flat line, can be laid efficiently, it should not be too thick (high) and not too wide. A thickness of 0.1 to 0.5 mm is preferred, whereby a thickness of 0.3 mm has proven to be advantageous. A width of 5 to 10 mm has proven to be advantageous, with a width of 6.5 mm being preferred. More than 3-wire lines 16 are also conceivable. They are useful if the ring lamp 1 is to contain additional functions that can be controlled independently or if a plurality of ring lamps are to be operated via the same line and need to be switched independently of one another.

Figure 5:
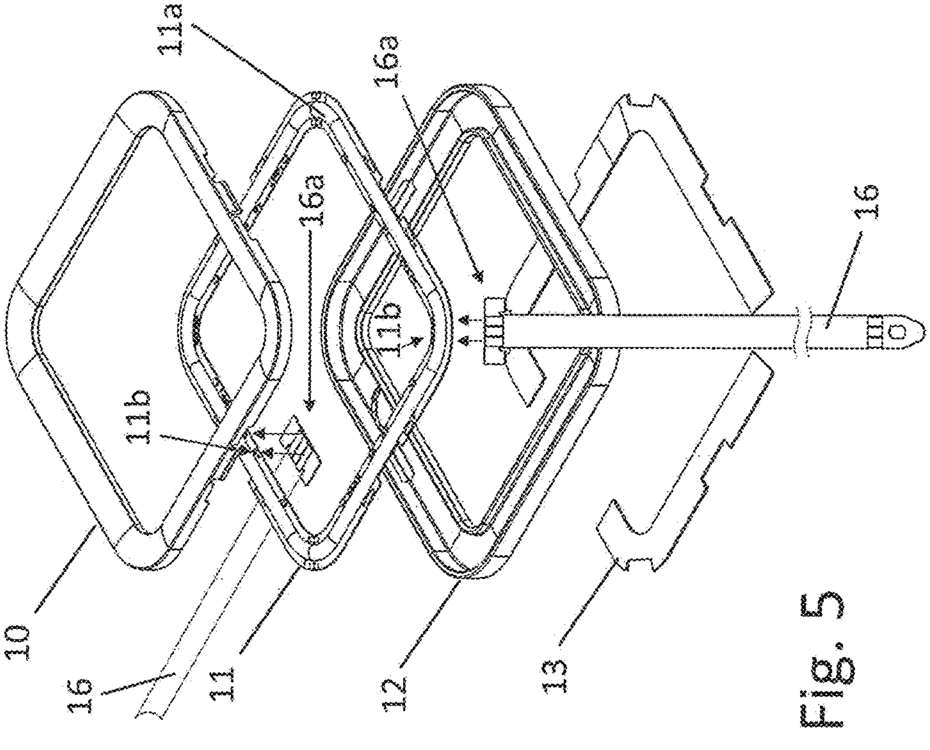
FIG. 5 shows a ring lamp in an exploded perspective view.

FIG. 5 shows the exploded view of the ring lamp 1 of FIG. 2, supplemented by the line 16. FIG. 5 shows two lines 16, each arranged at different locations on the illuminated means carrier 11. The line 16 shown in the middle of the figure is arranged by means of a contact 11*b* at a corner of the square shape of the illuminated means carrier 11. The line 11 shown on the left in the picture is arranged by means of a contact 11*b* on the side of the square of the illuminated means carrier 11. Usually only one of the contact types is required for operation. However, it is also conceivable for another luminaire or ring lamp 1 to be supplied from the same voltage source, with the supply line to this ring lamp 1 being implemented via the ring lamp shown.

Figure 6:
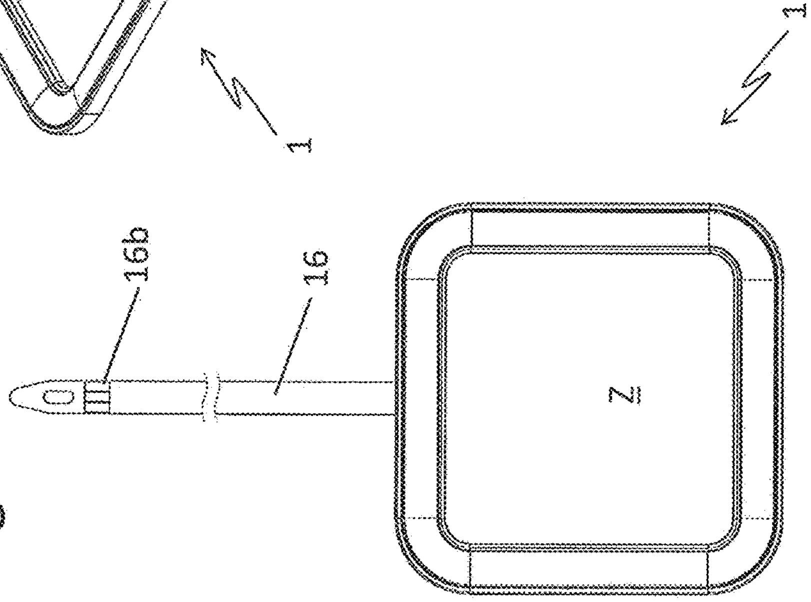
FIG. 6 shows an embodiment of a ring lamp with side contacting in plan view.

FIG. 6 shows a ring lamp 1 in plan view, in which the line 16 is arranged in the middle of the side on the illuminated means carrier 11 (not explicitly shown here).

Figure 7:
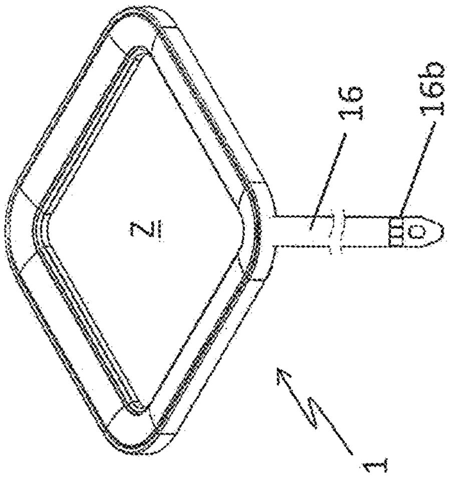
FIG. 7 shows an embodiment of a ring lamp with corner contacting in a perspective view.

FIG. 7 shows the perspective view of a ring lamp 1, in which the line 16 is contacted to the illuminated means carrier 11 at one corner of the square.

Figure 8:
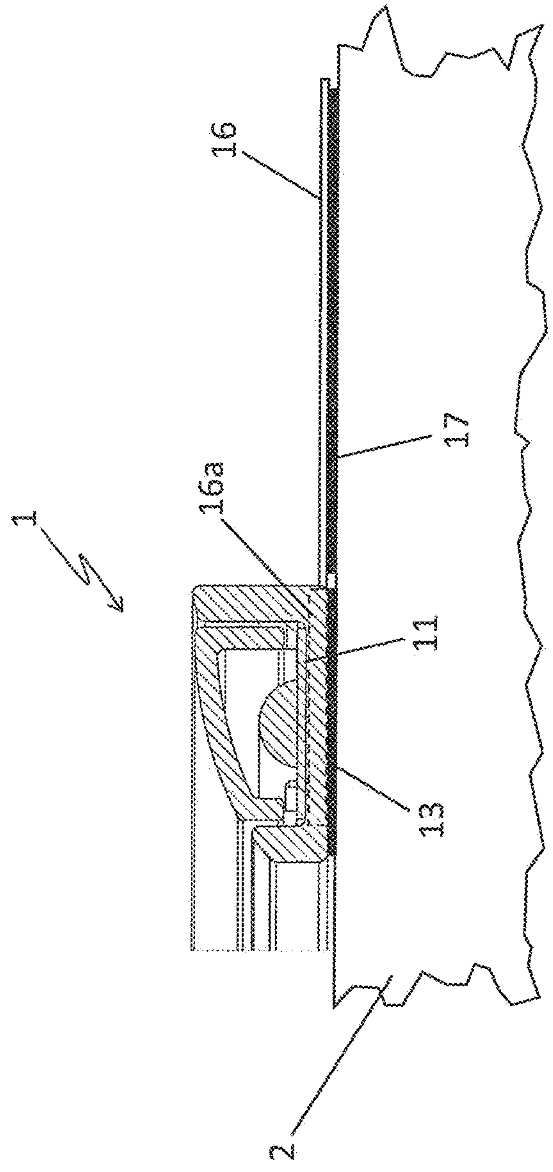
FIG. 8 shows a partial sectional view of a ring lamp with no feedthrough in the mounted state.

FIG. 8 shows a partial sectional view through a mounted ring lamp 1 at the point where contacting takes place. A furniture component 2 is shown, on which the ring lamp 1 and the line 16 are each arranged by means of a self-adhesive layer 13, 17. The contact surface 16*a* is connected to the illuminated means carrier 11 through the opening 12*a* in the receiving housing 12 (not shown here). The contacting can be achieved via a plug, soldering, a clamp connection or any other contacting method. Due to the adhesive mounting of the line 16 to the surface of the furniture component 2, this embodiment is particularly suitable for retrofitting a ring lamp 1.

Figure 11:
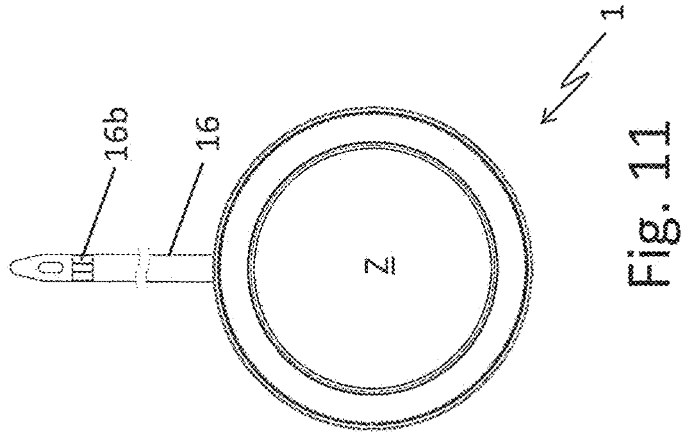
FIG. 11 shows the plan view of a round ring lamp.
Figure 10:
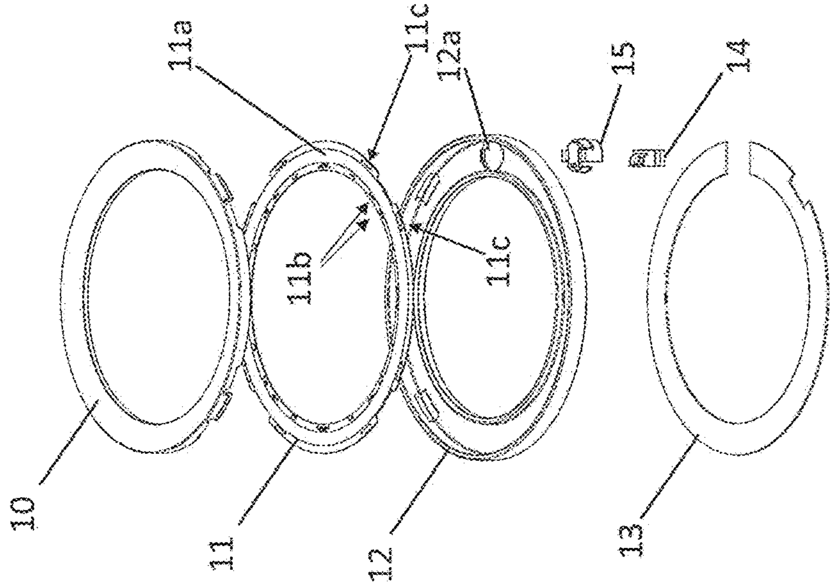
FIG. 10 shows the ring lamp of FIG. 10 in an exploded view.
Figure 9:
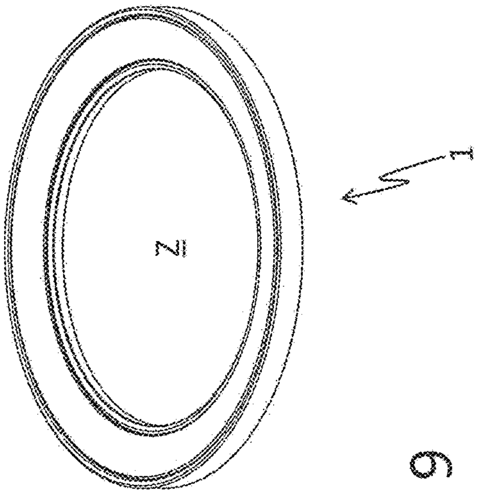
FIG. 9 shows the perspective view of a round ring lamp.

FIGS. 9 to 11 show a ring lamp in a circular embodiment. FIG. 9 shows a perspective view of the ring lamp 1, which has a circular intermediate space Z. The exploded view in FIG. 10 shows the same structure as the ring lamp 1 shown in FIG. 3. The illuminated means carrier 11, together with the illuminating means and the contacts or contact surfaces 11*b*, 11*c*, is inserted into the annular receiving housing 12, which has a U-shaped cross-section. The receiving housing 12, shown here by way of example in the form of an annular trough, is covered by a cover element 10 which is more or less transparent. An opening 12*a* is provided in the base of the housing 12, through which the illuminated means carrier is connected to a plug 14. The plug 14 is guided through a feedthrough 15, which allows a supply line to be routed beneath the surface. A self-adhesive layer 13 is arranged beneath the receiving housing 12, allowing the ring lamp to be affixed to the furniture component 2. FIG. 11 shows a round ring lamp 1 in plan view. The line 16 is connected to the illuminated means carrier 11 below the housing and extends radially outwards. At the radially outer end of the line, a contact surface 16*b* is arranged for supplying current, wherein the contact surface 16*b* can additionally be provided with a strain relief. This facilitates handling of the ring lamp 1 such as maintenance or repair without unintendedly impairing or even damaging the contact between the line 16 and the power supply.

With a ring lamp 1 according to the invention, it is possible to install the ring lamp 1 as part of the original build and indeed subsequently as a retrofit.

The invention claimed is:

1. A ring lamp (1), comprising a receiving housing (12) which is annular, in particular circular, oval, rectangular, or square, and which surrounds an intermediate space (Z), and in which an illuminating means (11*a*), preferably an LED illuminating means, is accommodated, said illuminating means extending correspondingly in an annular, in particular circular, oval, rectangular, or square manner, and a cover element (10) which is annular, in particular circular, oval, rectangular, or square, and which closes the receiving housing (12), wherein the illuminating means (11*a*) is electrically connected to a line (16) via contacts, preferably contact surfaces (11*b*), directly or indirectly via a plug (15):

i) wherein the line (16) is guided as a flat line out of the receiving housing (12), or ii) on the side of the receiving housing (12) facing away from the illuminating means (11*a*), a protruding feedthrough (15) is arranged, through which the line (16) is guided, in particular as a flat line, wherein the line (16) is a flat line made of a strip of a flexible insulating material, in particular plastics material, with conductor tracks and contacts, preferably contact surfaces, applied thereto.

2. The ring lamp (1) according to claim 1, wherein the line (16) is soldered to a contact (11*b*; 11*c*) of the illuminating means (11*a*).

3. The ring lamp (1) according to claim 1, wherein the receiving housing (12) and/or the line (16) comprises a self-adhesive layer (13; 17).

4. The ring lamp (1) according to claim 1, wherein an opening (12*a*) is provided in the receiving housing (12), at which the feedthrough (15) is arranged.

5. The ring lamp (1) according to claim 4, wherein the line (16) is in contact with the illuminating means (11*a*) through the opening (12*a*).

6. The ring lamp (1) according to claim 1, wherein the line (16) is at least a 2-wire line.

7. The ring lamp (1) according to claim 1, wherein the flat line (16) has at least one of the following properties:

a) a current carrying capacity of 4-8 A;
b) a dielectric strength of 200-800 V;
c) a width of 6.5 mm;
d) a strain relief on at least one;
e) a length of 200-400 mm;
f) a thickness of 0.3 mm; and
g) a self-adhesive layer (17).

8. A furniture component (2) to which at least one ring lamp (1) according to claim 1 is attached, wherein the line (16) is guided through a recess (2*a*, 2*b*) in the furniture component (2) or is glued to a surface of the furniture component (2).

9. The ring lamp (1) according to claim 1, wherein the line (16) is a 3-wire flat line.

10. The ring lamp (1) according to claim 1, wherein the flat line has at least one of the following properties:

a) a current carrying capacity of at least 6 A;
b) a dielectric strength of at least 500 V;
c) a width of 6.5 mm;
d) a strain relief on both ends;
e) a length of 300 mm;
f) a thickness of 0.3 mm; and
g) a self-adhesive layer (17).

11. A ring lamp (1) comprising an annular receiving housing (12) which surrounds an intermediate space (Z), and in which an illuminating means (11*a*) is accommodated, said illuminating means being annular in a manner correspondingly to the annular receiving housing (12), and a cover element (10) which closes the receiving housing (12), said cover being annular in a manner correspondingly to the annular receiving housing (12), wherein the illuminating means (11*a*) is electrically connected to a line (16) via contacts via a plug (15), wherein the line (16) is guided as a flat line out of the receiving housing (12), wherein the line (16) is a flat line made of a strip of a flexible insulating material with conductor tracks and contacts applied thereto.

12. The ring lamp (1) according to claim 11, further comprising a protruding feedthrough (15) arranged on a side of the receiving housing (12) facing away from the illuminating means (11*a*), through which the line (16) is guided.

13. The ring lamp (1) according to claim 12, wherein the illuminating means is an LED illuminating means.

14. The ring lamp (1) according to claim 11, wherein the annular housing (12) is selected from the group consisting of circular, oval, rectangular, and square annular housings.

15. The ring lamp (1) according to claim 11, wherein the contact tracks and surfaces are contact surfaces, and wherein the illuminating means (11*a*) is electrically connected to the line (16) via the contact surfaces (11*b*) via the plug (15).

16. The ring lamp (1) according to claim 11, further comprising a furniture component (2) to which the ring lamp (1) is attached, wherein the flat line is guided through a recess (2*a*, 2*b*) in the furniture component (2) or is glued to a surface of the furniture component (2).

17. The ring lamp (1) according to claim 11, wherein the flat line is made of a strip of a flexible plastic insulating material, with conductor tracks and contacts applied thereto.

18. The ring lamp (1) according to claim 17, wherein the conductor tracks and contacts are contact surfaces.

* * * * *